Nov. 5, 1957 W. B. JONES, JR., ET AL 2,812,483
ELECTRO-MECHANICAL DATA TRANSMISSION SYSTEM
Filed Nov. 19, 1945 2 Sheets-Sheet 1
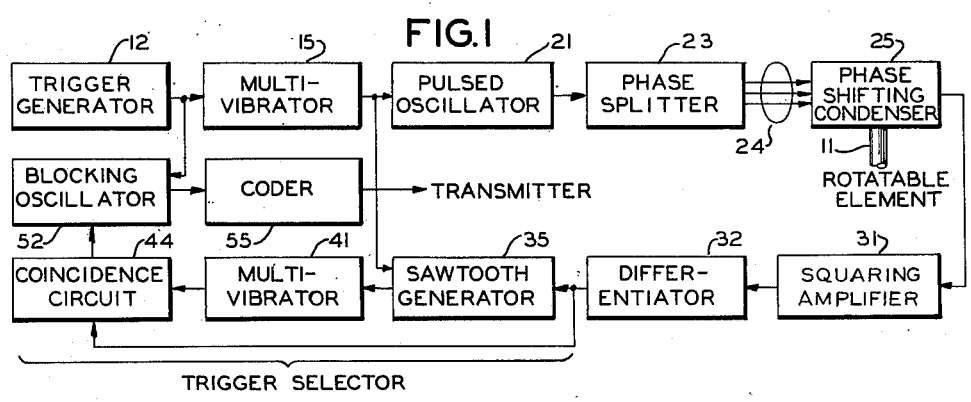
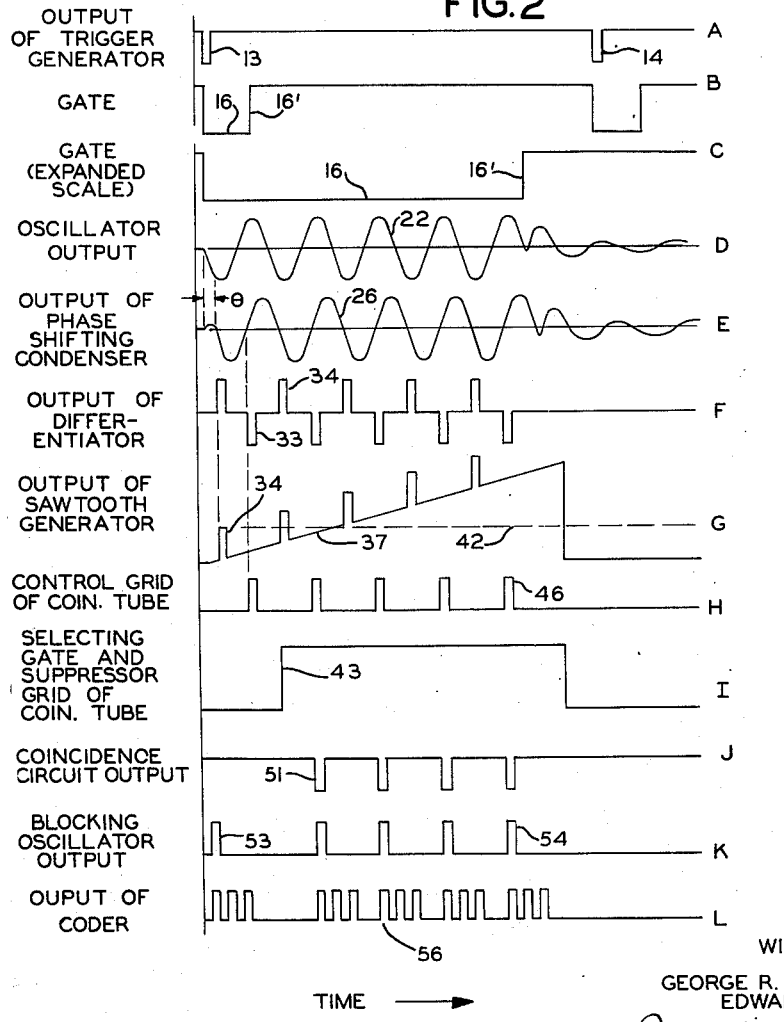
INVENTORS
WILLIAM B. JONES, JR.
DAVID GALE
GEORGE R. GAMERTSFELDER
EDWARD F. MACNICHOL JR.
BY
ATTORNEY Nov. 5, 1957　　W. B. JONES, JR., ET AL　　2,812,483
ELECTRO-MECHANICAL DATA TRANSMISSION SYSTEM
Filed Nov. 19, 1945　　2 Sheets-Sheet 2

INVENTORS
WILLIAM B. JONES, JR.
DAVID GALE
GEORGE R. GAMERTSFELDER
EDWARD F. MACNICHOL JR.
BY
ATTORNEY

United States Patent Office 2,812,483
Patented Nov. 5, 1957

2,812,483

ELECTRO-MECHANICAL DATA TRANSMISSION SYSTEM

William B. Jones, Jr., Belmont, David Gale, Boston, George R. Gamertsfelder, Watertown, and Edward F. MacNichol, Jr., Hamilton, Mass., assignors, by mesne assignments, to the United States of America as represented by the Secretary of the Navy Application November 19, 1945, Serial No. 629,668

5 Claims. (Cl. 318—28)

This invention relates in general to electro-mechanical data transmission systems and more particularly to the problem of establishing the motional synchronism of movable elements in widely separated equipments.

A data transmission system generates at a transmitter electrical information instantaneously related to the position of a movable element with respect to a reference position. At a receiver this electrical information is operative upon a servo mechanism or other suitable electro-mechanical follow-up system to orient a receiver movable element in a corresponding position relative to a reference. Absolute synchronism is established when transmitter and receiver movable elements are continuously operative at identical speed and in phase.

There are many equipments which require a synchronizing system for successful operation. As a representative example thereof, consider the problem presented by a radio echo detection system, which for purposes of increased range, utilizes a rotatable search antenna carried in a suitably designed aircraft. The information gathered by the search system is simultaneously presented upon indicators in the aircraft and at one or more receiving stations on shipboard or land. For interpretation of the data presented, it is essential that the instantaneous angular position of the search antenna relative to a specified reference direction be known at all receiving stations. Operation of a conventional plan position indicator at a receiving point requires that the indicator deflection coil rotate in synchronism with the search antenna, while continuously indicating direction corresponding to the antenna radiation direction relative to a fixed bearing.

It is thus the function of the airborne unit to generate and transmit electrical information regarding the angular position of a rotatable shaft. However, it is also required that the airborne unit transmit the video signals obtained as echoes of pulse radiation during the antenna search. The aircraft relayed signals are combined into a single transmission by transmitting the angle data during a synchronizing period which occurs prior to a search period initiated by the generation and the transmission of a high energy pulse.

There are available a number of systems for synchronizing separated rotatable shafts connected only by a radio or wire link. All such systems utilize a particular form of synchronizing signal transmitted during a synchronizing period and applied to a receiver follow-up mechanism. The present system contemplates and has as a specific object the provision of an improved and extremely accurate but simplified electrical system for maintaining phase and rotational synchronism between separated rotatable elements.

Another object of this invention is to provide a synchronizing signal comprising a reference time signal and another signal whose displacement from the reference is indicative of the orientation of a rotatable element.

A further object of this invention is to provide a receiver comparison circuit which generates a signal whose magnitude and polarity are dependent upon the relation between a received synchronizing signal and a locally generated signal.

A still further object of this invention is to provide a transmitter-receiver synchronizing system wherein the angle data is generated by a phase shift capacitor.

Another object of this invention is to generate a synchronizing signal which comprises a reference timing pulse and a plurality of selected pulses of fixed frequency and of a phase which indicates the relative angular position of a rotatable element.

These and other objects of the present invention will now become apparent from the following detailed specification taken in connection with the accompanying drawings in which:

Fig. 1 is a block diagram of the transmitter synchronizing circuits;

Fig. 2 is a graphical representation of the idealized circuit waveforms generated by the circuits illustrated in Fig. 1;

Figure 3:
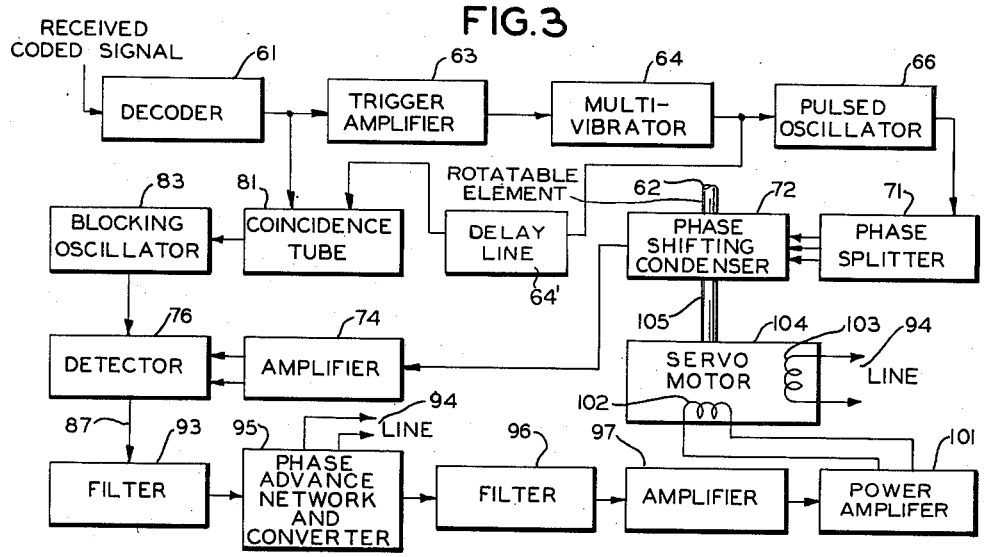
Fig. 3 is a block diagram of the receiver synchronizing circuits.

Referring now to Fig. 1, there is shown an electrical system for generating information concerning the instantaneous angular position of a rotatable shaft 11 relative to a fixed position thereof. The particular system illustrated will for reasons of clarity be discussed in connection with an airborne radio echo detection system which relays information to another point, but it will be understood that the synchronizing system is basic and need not be so limited.

A trigger generator 12, having a predetermined repetition frequency generates a succession of reference timing impulses as for example pulses 13 and 14 in Fig. 2A. The trigger pulses 13 and 14 determine the operation of the synchronizing channel illustrated in Fig. 1, and in addition, initiate through a delay circuit, not shown, the operation of a high energy, radio frequency pulse generator. These high frequency pulses are transmitted from a rotatable antenna (not shown) coupled to shaft 11. Reflected energy received by this antenna is relayed to the remote receiving station in a period between synchronizing periods.

In the synchronizing channel, the reference timing triggers 13, 14 are coupled to a multivibrator 15 which responds to the leading edge of each trigger to generate a substantially rectangular voltage gate 16 in Fig. 2B, of a duration equal to the desired synchronizing period. The period of the voltage gate is less than that between triggers 13 and 14. The period between the trailing edge 16' of voltage gate 16 and the leading edge of the following trigger 14 is used for the transmission of a radio frequency pulse and the reception and relaying of echoes.

In Fig. 2C, the voltage gate 16 is shown to an expanded time scale, and the circuit operations which occur during this gate period will now be discussed. As illustrated in Fig. 1 the negative voltage gate 16 is applied to a normally inoperative oscillator 21. This oscillator 21 is a conventional pulsed oscillator which when operative produces a stable output signal of a fixed frequency. The oscillator is normally cutoff by a circuit, not shown, which responds to the negative gate signal 16 to permit normal operation.

The signal output 22 of the pulsed oscillator 21 is shown in Fig. 2D. As illustrated, the first half cycle of the output signal of the pulsed oscillator 21 is initiated at the leading edge of the voltage gate 16. At the termination of the voltage gate 16, represented by the trailing edge 16', the pulsed oscillator 21 again becomes inoperative and the output signal thereof is rapidly damped out. The signal generated in the pulsed oscillator 21 is coupled to a phase-splitting network 23 whose output appears on three leads 24 and constitutes a three-phase voltage signal. This three-phase signal voltage is applied to the three stator plates of a conventional phase-shifting capacitor 25 including a rotatable element attached to the shaft 11. The phase of the output signal obtained from this phase shifting capacitor 25 is dependent upon the instantaneous angular position of the shaft 11, and is variable with respect to the output of the pulsed oscillator 21 from zero to 360 degrees. The output signal 26 of the phase-shifting capacitor 25 is illustrated in Fig. 2E and a small phase shift $\theta$ is shown relative to the oscillator output 22. It is to be noted that the angular or time displacement $\theta$ of the signal 26 may also be measured relative to the leading edge of the reference timing trigger 13.

The alternating signal 26 is applied to an amplifier 31 which amplifies and clips both positive and negative half cycles of the signal, whereby the output thereof is substantially a square wave. This square wave is in turn applied to a differentiator circuit 32 which as is well understood provides sharp pulses which correspond in time to the zeroes of the phase shifted sine wave 26. The differentiator output signal comprising a plurality of negative pulses 33 and equally spaced positive pulses 34 is illustrated in Fig. 2F.

Each of the trigger pulses 33 which appear in the output circuit of the differentiator 32 are indicative of the relative phase shift obtained in the phase-shifting capacitor 25. Thus, the time separation between the reference timing signal 13 and the pulses 33 appearing at the zeros of the phase-shifted sine wave 26 may be expressed by the fraction $$\frac{\theta + 360n}{360f}$$

wherein $\theta$ is the phase shift illustrated in Fig. 2D, $n$ is the number of the cycle of the pulsed oscillator under consideration and $f$ is the frequency of the pulsed oscillator. However, this general relationship specifying the time delay between the reference timing trigger 13 and an impulse such as 33 is not necessarily correct for the first and last few impulses so generated. The timing error in the first and last impulses 33 comes about as a result of the transient response in the phase shift network 23 and 25, which spurious waveforms have been omitted in the illustration of waveforms 22 and 26 in Figs. 2D and E.

In order to detect synchronizing error at the receiver to be described, it is essential that the transmitter synchronizing pulses 33 all indicate the true relative phase position of the shaft 11. To accomplish this, a selected group of pulses 33 which does not include the first or last transient pulses is separated by selector circuit including a sawtooth generator 35. The operation of the sawtooth generator 35 is controlled by the voltage gate 16, generated in multivibrator 15. Thus, the initiation of the sawtooth voltage corresponds with the initiation of operation of pulsed oscillator 21. During the period of the voltage gate 16, the sawtooth generator provides a linear rising voltage to which the positive differentiator pulses 34 are applied. The output of the sawtooth generator is thus as illustrated by waveform 37 in Fig. 2G. This output signal 37 is coupled to a multivibrator 41, which has a predetermined triggering voltage requirement 42 as illustrated in Fig. 2. In this manner, the operation of the multivibrator 41 will be delayed in time from the leading edge of gate 16 by the time required for the sawtooth voltage to rise to the triggering voltage 42.

The output of multivibrator 41 comprises a positive voltage gate 43, as illustrated in Fig. 2I, which is utilized in a coincidence circuit 44 to select a predetermined number of negative differentiator output signals 33. It is thus desirable that the leading edge of voltage gate 43 fall between two negative triggers 33. For this purpose, the rate of rise of the sawtooth voltage 37 is adjusted with respect to the amplitude of positive triggers 34, such that the multivibrator 41 will always trigger upon a positive pulse 34 as illustrated in Fig. 2. The negative differentiator output pulses 33 are inverted and applied to one grid of the coincidence tube circuit 44 as a plurality of regularly spaced positive pulses 46, as illustrated in Fig. 2H. Another grid of the coincidence tube circuit 44 is energized by the gate voltage output 43 of the multivibrator 41. This gate is timed to include a number of synchronizing pulses 46, as applied to the coincidence circuit 44. In this particular application, the gate voltage generated by multivibrator 41 covers four of the pulses 46, whereby the output of the coincidence circuit 44 comprises four negative pulses 51 as illustrated in Fig. 2J.

Due to the distortion introduced by the various timing circuits described to this point, the pulses 51 need not be rectangular and are applied to a blocking oscillator 52 or other pulse shaping means for shaping. A blocking oscillator circuit capable of performing in the present system is disclosed in Chapter 2, Article 19 of "Principles of Radar," by the staff of the MIT Radar School, published by the Technology Press in 1944. The reference timing signal 13, generated by the trigger circuit 12, is also applied to the blocking oscillator 52, thereby producing an output signal which comprises a suitably shaped reference timing signal 53 and four shaped synchronizing pulses 54, the spacing of which with respect to timing signal 53 is indicative of the instantaneous angular position of the rotatable shaft 11. The output signal 53, 54 of the blocking oscillator 52, illustrated in Fig. 2K, may now be relayed to a remote receiver for the purpose of synchronizing a rotating element thereat with the rotatable shaft 11. However, in order to eliminate the effects of both man-made and natural interference, the pulses 53, 54 are applied to a coder 55 which operates as is well understood to produce for each applied impulse a plurality of pulses having a specified duration and spacing therebetween. As illustrated in Fig. 2L, the coder 55 is operative to provide three pulses for each input pulse producing a final waveform 56 which is relayed by a carrier signal to the remote receiver. In the period between the synchronizing signals the relay carrier may be modulated by the information obtained by the radio detection apparatus during the antenna search.

Figure 4:
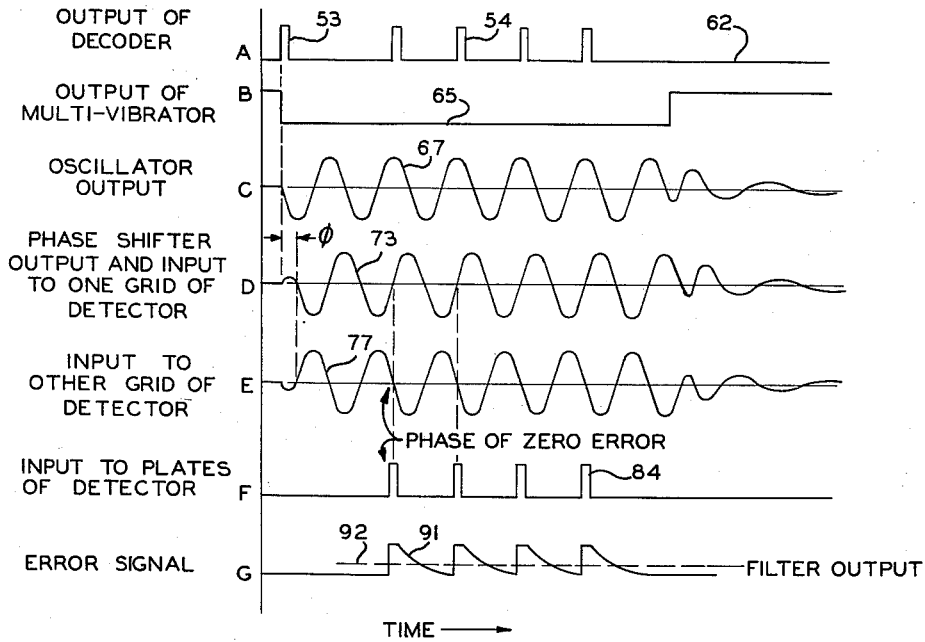
Fig. 4 is a graphical representation of the receiver circuit waveforms.

At the receiver, the demodulated carrier signal is impressed upon the proper separating channels, wherein the synchronizing information is selected and applied to the receiver synchronizing system illustrated in Fig. 3. The search information is applied to a channel, not shown, which provides at the output thereof a suitable visual presentation. The demodulated signal input to the synchronizing receiver channel illustrated in Fig. 3 is essentially a signal of waveform 56 as illustrated in Fig. 2L. The application of this waveform to the decoder 61 in the receiver channel results in an output signal 62 as illustrated in Fig. 4A and corresponds essentially with the output of transmitter blocking oscillator 52. Circuits for performing the above coding and decoding operations are disclosed in U. S. patents, Serial Nos. 2,266,154 and 2,227,052 of December 16, 1941, and December 31, 1940, respectively. Numbering the elements of the decoded received signal to correspond with the similar transmitter waveforms, the signal comprises a reference timing trigger 53 and four equally spaced synchronizing pulses 54, which relative to the timing trigger 53, provides angle data for the receiver. At the receiver of Fig. 3, the rotatable shaft 62 is the movable element to be synchronized with the corresponding shaft 11 at the transmitter. The shaft 62 as previously described may be employed to drive the deflection coil of a plan position indicator for the detection equipment. The decoded signal output 53, 54 is applied to a trigger amplifier 63. This amplifier may be of the type disclosed in Chapter 4, Article 15 of the above "Principles of Radar." The amplified reference timing signal 53 triggers a multivibrator 64, thereby generating a rectangular voltage gate 65 as illustrated in Fig. 4B. The rectangular voltage gate corresponds in time and duration to the voltage gate 16, Fig. 2C, generated by the reference timing signal 13 of the transmitter. The negative voltage gate 65 when applied to a pulsed oscillator 66 instantaneously removes a circuit damping signal and the oscillator generates an alternating signal 67 as illustrated in Fig. 4C, of a frequency equal to that generated by pulsed oscillator 21 at the transmitter. The first half cycle of the alternating voltage wave 67 begins in time with the leading edge of the voltage gate 65. The oscillator output is damped out rapidly at the termination of rectangular gate 65.

In accordance with the principles previously described in connection with the transmitter, the alternating voltage output of the pulsed oscillator 66 is applied to a phase-splitter circuit 71 which provides a three-phase alternating voltage output for application to the three stators, not shown, of the phase-shifting capacitor 72. The output thereof is a single alternating voltage 73 illustrated in Fig. 4D which as applied to amplifier 74 is shifted in phase relative to the pulsed oscillator output voltage 67 by an amount between the limits of 0° and 360° dependent upon the instantaneous angular position of the rotatable shaft 62 relative to a fixed position thereof. This phase shift is designated by the angle $\phi$ in Fig. 4D and corresponds to the angular or time displacement between the phase shifted output and the leading edge of the incoming reference timing trigger 53. The voltage output of amplifier 74 is transformer-coupled to the grids of a double triode detector 76. The instantaneous potentials applied to the grids of the triodes are 180° out of phase as illustrated by the grid voltage waveforms 73 and 77, Figs. 4D and E.

Returning now to the output of the decoder 61, the reference timing trigger 53 and the synchronizing pulses 54 are applied to a coincidence tube 81. The rectangular voltage gate 65 generated by the multivibrator 64 is also applied to the coincidence tube 81. However, the delay line 64' transferring the voltage gate 65 to the coincidence tube is such that the leading edge thereof is delayed in time so that the output of the coincidence tube 81 does not include the reference timing trigger 53. This output signal, which now comprises only the four synchronizing pulses, for each cycle, are applied to a blocking oscillator 83 for shaping such that the output thereof comprises the four rectangular synchronizing pulses 84 illustrated in Fig. 4F. These pulses 84 are applied directly to the two plates of the double triode detector 76 in phase. In the voltage waveforms illustrated in Fig. 4, the phase shifted oscillator voltages 73 and 77 and the synchronizing pulses 84 are shown for a condition of zero error, that is to say, that the transmitter and receiver rotatable shafts 11 and 62, respectively, are exactly in phase. This condition occurs when the angle $\theta$ of phase displacement at the transmitter corresponds with the angle $\phi$ at the receiver. During this particular period of exact synchronism, the voltages applied to the double triode detector plates are passing through zero when the pulses 84 occur.

If on the other hand, the angle $\phi$ does not equal the angle $\theta$ the detector 76 will charge a capacitor, not shown, by an amount proportional to the angle difference and of a polarity (positive or negative) indicative of whether the receiver rotatable element is ahead or behind the corresponding rotatable element at the transmitter. When an angle error exists, the blocking oscillator output pulses will result in a voltage appearing on detector output lead 87 of waveform 91 as illustrated in Fig. 4G. The average 92 of this waveform also shown in Fig. 4G is obtained by a filter 93, Fig. 3, and is representative of the error, both in magnitude and direction. This filtered D. C. error signal 92 is supplied to a converter network 95, Fig. 3, which as is well understood is energized by a power line 94 and provides an alternating current output, the magnitude of which is dependent upon the magnitude of the applied D. C. error signal and the phase of which is that of the line voltage or 180° displaced therefrom dependent upon the polarity of the D. C. error signal 92. A circuit capable of performing this operation is disclosed in the copending application of O. A. Tyson, Serial No. 608,314, filed August 1, 1945, assigned to the same assignee as the present case and now U. S. Patent 2,473,457 of June 14, 1949. The signal output of the converter 95 is applied to a filter 96 so that a sine wave at line frequency is obtained therefrom. The circuit of a low-pass filter capable of filtering the line frequency is shown on page 32 of "Ultra High Frequency Techniques" by J. G. Brainerd, Glenn Koehler, Herbert J. Reich and L. F. Woodruff, published July 19, 1942, by D. Van Nostrand Co., Inc. This sine wave output is amplified in a servo-mechanism amplifier 97 and driver 101 and applied to one winding 102 of a two-phase alternating current motor 104. The other winding 103 of the motor is continuously energized from the power line 94 previously mentioned in connection with converter 95. The drive shaft 105 of the servo motor 104 is used to drive the rotating, synchronized element at the receiver, which in the example mentioned, is a deflection coil, and is directly coupled to the rotatable shaft 62 and thus to the rotating element of the phase shifting capacitor 72.

From the basic principles of operation of servo mechanisms, it is clear that the error signal output of the detector 76 will drive the servo motor 104 in that direction which tends to reduce the error signal to zero. The rotatable element attached to shaft 62 is thereby driven in phase and rotational synchronism with the corresponding rotatable element attached to shaft 11 at the transmitter of Fig. 1. To minimize the hunting of the servo mechanism 104, a phase advance network may be incorporated in the converter 95 so that the alternating current output thereof is not precisely in phase, or 180° out of phase, with the line current.

It is clear that the synchronizing system is operative at a rate which corresponds with the repetition rate of the reference timing triggers 13 and 14, illustrated in Fig. 2A. In a radio echo detection system, of the type described, this synchronizing signal rate may be of the order of 300 cycles per second. Thus if interference results in a loss of a synchronizing cycle, the total error introduced is extremely small and is corrected for when the next synchronizing signal is received.

Various features of the above-described synchronizing system are subject to modification. For example, the basic system described need not be limited to a radio echo detection system, but may be incorporated in any system which permits synchronization by the use of discontinuous synchronizing signals occurring at a substantially regular rate. The system need not be operated with the particular servo mechanism system illustrated. Also, the number of trigger pulses selected at the transmitter and the relative position thereof may be varied to fit the needs of the particular system.

Thus since certain changes may be made in the above described system and different embodiments of the invention could be made without departing from the scope thereof, it is intended that all matter contained in the above description and as shown in the accompanying drawings shall be interpreted as illustrative and not in a limiting sense.

What is claimed is:

1. In an electrical transmission system, apparatus for establishing rotational synchronism between rotatable elements at a transmitter and a receiver comprising means at said transmitter for periodically generating a reference timing impulse, an oscillator responsive to said reference timing impulse for generating an alternating signal voltage of predetermined duration, a phase shift network for producing a corresponding alternating signal voltage shifted in phase with respect to said oscillator alternating voltage, said phase shift being proportional to the instantaneous displacement of said transmitter rotatable element with respect to a reference position, circuit means for transforming said phase shifted signal into a succession of impulses of corresponding frequency and phase shift, means for selecting a predetermined number of said phase shifted impulses for synchronizing signals and means for transmitting said reference timing signals and said synchronizing signals, means at said receiver for receiving said transmitted signals, a receiver oscillator responsive to said reference timing signal for generating an alternating signal voltage, means for shifting in phase said last mentioned alternating voltage by an amount proportional to the displacement of said receiver rotatable element with respect to a reference position, circuit means for comparing the phase shift of said received synchronizing signals and said receiver phase shifted alternating voltage, and a servo mechanism responsive to phase difference in said phase comparing circuit for driving said receiver rotatable element.

2. Apparatus as described in claim 1, wherein said means at said transmitter for selecting a predetermined number of said synchronizing impulses comprises a coincidence electron tube circuit energized by said transmitter phase shifted succession of impulses and a voltage gate of predetermined duration, said voltage gate having a leading edge delayed in time from said reference timing signal and occurring substantially midway in time between two of said phase shifted impulses.

3. In a system comprising means for generating reference timing pulses having a predetermined repetition rate, means for generating groups of a predetermined number of equi-spaced synchronizing pulses, said groups also being generated at said predetermined repetition rate, and means for varying the spacing between each reference timing pulse and a following group of equi-spaced synchronizing pulses, apparatus for controlling the position of a rotatable element with respect to a reference position in accordance with the magnitude of said spacing between a reference pulse and a following group of synchronizing pulses comprising, means responsive to each of said reference timing pulses for generating a voltage gate of predetermined time duration, an oscillator responsive to said voltage gate for generating an alternating signal for the duration of said voltage gate, means for shifting the phase of said last-mentioned alternating signal by an amount proportional to the displacement of said rotatable element with respect to said reference position, means energized by said reference pulses, said groups of synchronizing pulses, and said voltage gates for selecting said groups of synchronizing pulses, circuit means for comparing the phase of the pulses of each of said groups of equi-spaced synchronizing pulses with that of the phase-shifted alternating signal, and a servo-mechanism responsive to the phase difference in said phase comparing circuit for driving said rotatable element in a direction to cause said phase-shifted alternating signal to be in predetermined phase relationship with the pulses of said groups of equi-spaced pulses.

4. Apparatus of claim 3 wherein the frequency of said alternating signal output of said oscillator is equal to the pulse repetition rate of said equi-spaced synchronizing pulses of said groups.

5. Apparatus of claim 3, wherein said means energized by said reference pulses, said groups of synchronizing pulses and said voltage gates for selecting said synchronizing pulses, comprises, a delay line for delaying each of said voltage gates for a predetermined time interval, and a coincidence circuit having two inputs and energized by said delayed voltage gates at one input and said timing and synchronizing pulses at the other input, said predetermined time interval for which said voltage gates are delayed being of a duration greater than the duration of a reference pulse, whereby only the synchronizing pulses appear at the output of said coincidence circuit.

References Cited in the file of this patent

UNITED STATES PATENTS

| | | |
|---|---|---|
| 2,183,725 | Seeley | Dec. 19, 1939 |
| 2,256,487 | Moseley et al. | Sept. 23, 1941 |
| 2,351,759 | Grundman | June 20, 1944 |
| 2,422,074 | Bond | June 10, 1947 |
| 2,483,594 | Oliver | Oct. 4, 1949 |
| 2,516,765 | Ferrell | July 25, 1950 |